(12) United States Patent
Shina et al.

(10) Patent No.: US 11,848,934 B2
(45) Date of Patent: Dec. 19, 2023

(54) RESOURCE MANAGEMENT SYSTEM, RESOURCE MANAGEMENT METHOD, RESOURCE TRANSACTION MANAGEMENT DEVICE, RESOURCE MANAGEMENT DEVICE, AND PROGRAM

(71) Applicant: Nippon Telegraph and Telephone Corporation, Tokyo (JP)

(72) Inventors: Hideki Shina, Tokyo (JP); Kenta Shinohara, Tokyo (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 412 days.

(21) Appl. No.: 17/260,813

(22) PCT Filed: Jul. 10, 2019

(86) PCT No.: PCT/JP2019/027311
§ 371 (c)(1),
(2) Date: Jan. 15, 2021

(87) PCT Pub. No.: WO2020/017406
PCT Pub. Date: Jan. 23, 2020

(65) Prior Publication Data
US 2021/0320926 A1    Oct. 14, 2021

(30) Foreign Application Priority Data

Jul. 17, 2018  (JP) .................................. 2018-134211

(51) Int. Cl.
*H04L 9/40*        (2022.01)
*G06F 16/23*       (2019.01)

(52) U.S. Cl.
CPC ........ *H04L 63/102* (2013.01); *G06F 16/2379* (2019.01)

(58) Field of Classification Search
CPC ..... H04L 63/102; H04L 63/08; H04L 63/108; H04L 9/50
See application file for complete search history.

(56) References Cited

U.S. PATENT DOCUMENTS

| | | | |
|---|---|---|---|
| 2019/0268284 A1* | 8/2019 | Karame | H04L 47/828 |
| 2020/0204463 A1* | 6/2020 | Guan | G06F 21/604 |
| 2021/0081404 A1* | 3/2021 | Kempf | H04L 9/0637 |

OTHER PUBLICATIONS

[No Author Listed], "The Golem Project," Crowdfunding Whitepaper, Nov. 2016, 28 pages.

(Continued)

*Primary Examiner* — Nelson S. Giddins
(74) *Attorney, Agent, or Firm* — Fish & Richardson P.C.

(57) ABSTRACT

[Problem] It is possible to enable the centralized management of resource usage right and improve the reliability and tamper resistance of information related to the resource usage right.
[Solution] A resource transaction management apparatus 20 of the resource management system 1000 includes a resource setting unit 22 configured to receive resource provision information 300 from a resource provision apparatus 30, and generate resource usage right information 500 having the resource provision information 300 transmitted to a resource usage right management apparatus 10, and a matching processing unit 23 configured to receive resource request information 400 from a resource usage apparatus 40, determine a resource that satisfies a request condition by referring to each resource provision information 300 registered in a blockchain, generate usage right management information including usage right owner information and a usage time of the determined resource, using the resource request information 400, and transmit the new resource (Continued)

usage right information 500 having the generated usage right management information to the resource usage right management apparatus 10.

5 Claims, 10 Drawing Sheets

(56) References Cited

OTHER PUBLICATIONS

Boinc.berk.eley.edu, [online], "BOINC, Open-Source Software for volunteer computing," 2018, retrieved on Jun. 29, 2018, retrieved from URL<http://boinc.berkeley.edu/>, 9 pages (with English Translation).

* cited by examiner

RESOURCE MANAGEMENT SYSTEM, RESOURCE MANAGEMENT METHOD, RESOURCE TRANSACTION MANAGEMENT DEVICE, RESOURCE MANAGEMENT DEVICE, AND PROGRAM

CROSS-REFERENCE TO RELATED APPLICATIONS

This application is a National Stage application under 35 U.S.C. § 371 of International Application No. PCT/JP2019/027311, having an International Filing Date of Jul. 10, 2019, which claims priority to Japanese Application Serial No. 2018-134211, filed on Jul. 17, 2018. The disclosure of the prior application is considered part of the disclosure of this application, and is incorporated in its entirety into this application.

TECHNICAL FIELD

The present disclosure relates to a resource management system, a resource management method, a resource transaction management apparatus, a resource management apparatus, and a program for managing computer resources using a blockchain.

BACKGROUND ART

In related art, distributed computing has been adopted as a method capable of parallel processing data analysis and enormous calculation by connecting a plurality of computers via a network. In a system that employs the distributed computing to manage and share computer resources (hereinafter sometimes simply referred to as "resources"), information of the usage right of the resource is generally managed by a centralized database. For example, in BOINC (see Non Patent Literature 1), which is a distributed computing project, processing is distributed and executed by a plurality of computers, but management is performed by a centralized server (BOINC server).

Further, a system has been proposed in which computers are connected to each other by a peer-to-peer (P2P) network and computer resources are rented (shared). For example, in Golem (see Non Patent Literature 2), a requester (a user who uses a computer resource) uses a resource (rental) by paying a resource usage fee to a provider (a user who provides a computer resource). Golem uses blockchain (Ethereum) as a mechanism to realize the payment of the usage fee.

CITATION LIST

Non Patent Literature

Non Patent Literature 1: "BOINC, Open-Source Software for volunteer computing", [online], [searched on Jun. 29, 2018], Internet <URL: http://boinc.berkeley.edu/>
Non-Patent Literature 2: "The Golem Project Crowdfunding Whitepaper", [online], November 2016, [searched on Jun. 29, 2018], Internet <URL: https://golem.network/crowdfunding/Golemwhitepaper.pdf>

SUMMARY OF THE INVENTION

Technical Problem

However, the system for managing and sharing the information of the usage right of the resource as described in Non-Patent Literature 1 has a problem in the following points.

(Consistency) When a large number of unspecified users are targeted, the enormous number of targets makes it difficult to centrally manage resource information.
(Reliability) When the centralized database goes down, resources cannot be used.
(Tamper resistance) When the information about the right to use the resource (usage right information) is tampered, the resource will be used illegally.

In Golem described in Non-Patent Literature 2, the blockchain is used to implement the settlement of the resource usage fee, but the blockchain is not used in the management of the usage right of resource (resource usage right) itself and it did not solve the problems of consistency, reliability, and tamper resistance, relating to the management of resource usage right.

The present disclosure has been made in view of such a background, and objects of the present disclosure are to provide a resource management system, a resource management method, a resource transaction management apparatus, a resource management apparatus, and a program, which enable the centralized management of resource usage right and can improve the reliability and tamper resistance of information related to the resource usage right.

Means for Solving the Problem

In order to solve the problems mentioned above, the disclosure according to claim 1 provides a resource management system including a plurality of resource usage right management apparatuses configuring a blockchain system; and a resource transaction management apparatus connected to the resource usage right management apparatuses, in which the resource transaction management apparatus includes a resource setting unit configured to receive resource provision information including resource identification information of an available resource, a provision specification of the resource, an available time, and connection destination information of the resource from a resource provision apparatus, and generate resource usage right information having the resource provision information that is issued as a transaction to be registered in a blockchain and that is transmitted to the resource usage right management apparatus, and a matching processing unit configured to; receive resource request information including resource user identification information, a request specification for a resource of which usage is requested, and a request time from a resource usage apparatus, acquire the resource usage right information registered in the blockchain from the resource usage right management apparatus, determine a resource that satisfies a request condition indicated by the resource request information by referring to the resource provision information included in the acquired resource usage right information, generate usage right management information including usage right owner information and a usage time of the resource corresponding to the resource identification information of the determined resource, using the resource user identification information and the request time included in the resource request information, and transmit new resource usage right information having the generated usage right management information, which is issued as a transaction, to the resource usage right management apparatus, and the resource usage right management apparatus includes a blockchain control unit configured to acquire the resource usage right information, generate a block including the acquired resource usage right information, and register the generated block as a new block of the blockchain stored in a storage unit.

Further, the disclosure according to claim 4 provides a resource management method of a resource management system including a plurality of resource usage right management apparatuses configuring a blockchain system; and a resource transaction management apparatus connected to the resource usage right management apparatuses, the resource management method including; at the resource transaction management apparatus, receiving resource provision information including resource identification information of an available resource, a provision specification of the resource, an available time, and connection destination information of the resource from a resource provision apparatus; and transmitting resource usage right information having the resource provision information, which is issued as a transaction to be registered in a blockchain, to the resource usage right management apparatus, at the resource usage right management apparatus, acquiring the resource usage right information; generating a block including the acquired resource usage right information; and registering the generated block as a new block of the blockchain stored in a storage unit, at the resource transaction management apparatus, receiving resource request information including resource user identification information, a request specification for a resource of which usage is requested, and a request time from a resource usage apparatus; acquiring the resource usage right information registered in the blockchain from the resource usage right management apparatus; determining a resource that satisfies a request condition indicated by the resource request information by referring to the resource provision information included in the acquired resource usage right information; generating usage right management information including usage right owner information and a usage time of the resource corresponding to the resource identification information of the determined resource, using the resource user identification information and the request time included in the resource request information; and transmitting new resource usage right information having the generated usage right management information, which is issued as a transaction, to the resource usage right management apparatus; and at the resource usage right management apparatus, acquiring resource usage right information including the new usage right management information; generating a block including the acquired resource usage right information; and registering the generated block as a new block of the blockchain stored in a storage unit.

Further, the disclosure according to claim 5 provides a resource transaction management apparatus of a resource management system including a plurality of resource usage right management apparatuses configuring a blockchain system and the resource transaction management apparatus connected to the resource usage right management apparatuses, the resource transaction management apparatus including a resource setting unit configured to receive resource provision information including resource identification information of an available resource, a provision specification of the resource, an available time, and connection destination information of the resource from a resource provision apparatus, and generate resource usage right information having the resource provision information that is issued as a transaction to be registered in a blockchain and that is transmitted to the resource usage right management apparatus, and a matching processing unit configured to receive resource request information including resource user identification information, a request specification for a resource of which usage is requested, and a request time from a resource usage apparatus, acquire the resource usage right information registered in the blockchain from the resource usage right management apparatus, determine a resource that satisfies a request condition indicated by the resource request information by referring to the resource provision information included in the acquired resource usage right information, generate usage right management information including usage right owner information and a usage time of the resource corresponding to the resource identification information of the determined resource, using the resource user identification information and the request time included in the resource request information, and transmit new resource usage right information having the generated usage right management information, which is issued as a transaction, to the resource usage right management apparatus.

Further, the disclosure according to claim 7 provides a resource management apparatus of a resource management system comprising a plurality of the resource management apparatuses configuring a blockchain system, the resource management apparatus including a resource setting unit configured to receive resource provision information including resource identification information of an available resource, a provision specification of the resource, an available time, and connection destination information of the resource from a resource provision apparatus, and generate resource usage right information having the resource provision information that is issued as a transaction to be registered in a blockchain and that is output to a blockchain control unit, a matching processing unit configured to receive resource request information including resource user identification information, a request specification for a resource of which usage is requested, and a request time from a resource usage apparatus, acquire the resource usage right information registered in the blockchain stored in a storage unit, determine a resource that satisfies a request condition indicated by the resource request information by referring to the resource provision information included in the acquired resource usage right information, generate usage right management information including usage right owner information and a usage time of the resource corresponding to the resource identification information of the determined resource, using the resource user identification information and the request time included in the resource request information, and output new resource usage right information having the generated usage right management information, which is issued as a transaction, to the blockchain control unit, and the blockchain control unit configured to acquire the resource usage right information, generate a block including the acquired resource usage right information, and register the generated block as a new block of the blockchain stored in the storage unit.

As described above, since the resource usage right is registered and managed by the blockchain system, it is possible to centrally manage the resource usage right and improve the reliability and tamper resistance of the information related to the resource usage right.

The disclosure according to claim 2 provides the resource management system according to claim 1, in which the resource transaction management apparatus further includes an account management unit configured to execute, when receiving the resource provision information from the resource provision apparatus and when receiving the resource request information from the resource usage apparatus, account management that confirms legitimacy of a resource provider and a resource user.

As described above, it is possible to prevent the illegal registration and use of resources.

The disclosure according to claim 3 provides the resource management system according to claim 1 or 2, in which the resource transaction management apparatus further includes a resource usage right inquiry unit configured to acquire, upon receiving a resource usage right confirmation request for confirming legitimacy of a resource user from the resource provision apparatus, resource usage right information related to a registered resource of the resource provision apparatus from the blockchain stored in the resource usage right management apparatus and confirm legitimacy of the resource usage apparatus that has requested a resource usage for the resource provision apparatus by transmitting usage right owner information and a usage time registered in the usage right management information included in the acquired resource usage right information to the resource provision apparatus that has transmitted the resource usage right confirmation request.

As described above, the resource transaction management apparatus transmits usage right management information of the resources registered in the blockchain to the resource provision apparatus. Accordingly, the resource provision apparatus can provide the resource after confirming the legitimacy of the user when providing the resource to the resource usage apparatus.

The disclosure according to claim 6 provides a program for causing a computer to function as the resource transaction management apparatus according to claim 5.

As described above, each function of the resource transaction management apparatus according to claim 5 can be implemented by using a general computer.

The disclosure according to claim 8 provides a program for causing a computer to function as the resource management apparatus according to claim 7.

As described above, each function of the resource management apparatus according to claim 7 can be implemented by using a general computer.

Effects of the Invention

According to the present disclosure, a resource management system, a resource management method, a resource transaction management apparatus, a resource management apparatus, and a program may be provided, which enable the centralized management of resource usage right and can improve the reliability and tamper resistance of information related to the resource usage right.

DESCRIPTION OF EMBODIMENTS

Next, a resource management system 1000 or the like in an embodiment for carrying out the present disclosure (hereinafter referred to as the present embodiment) will be described.

Figure 1:
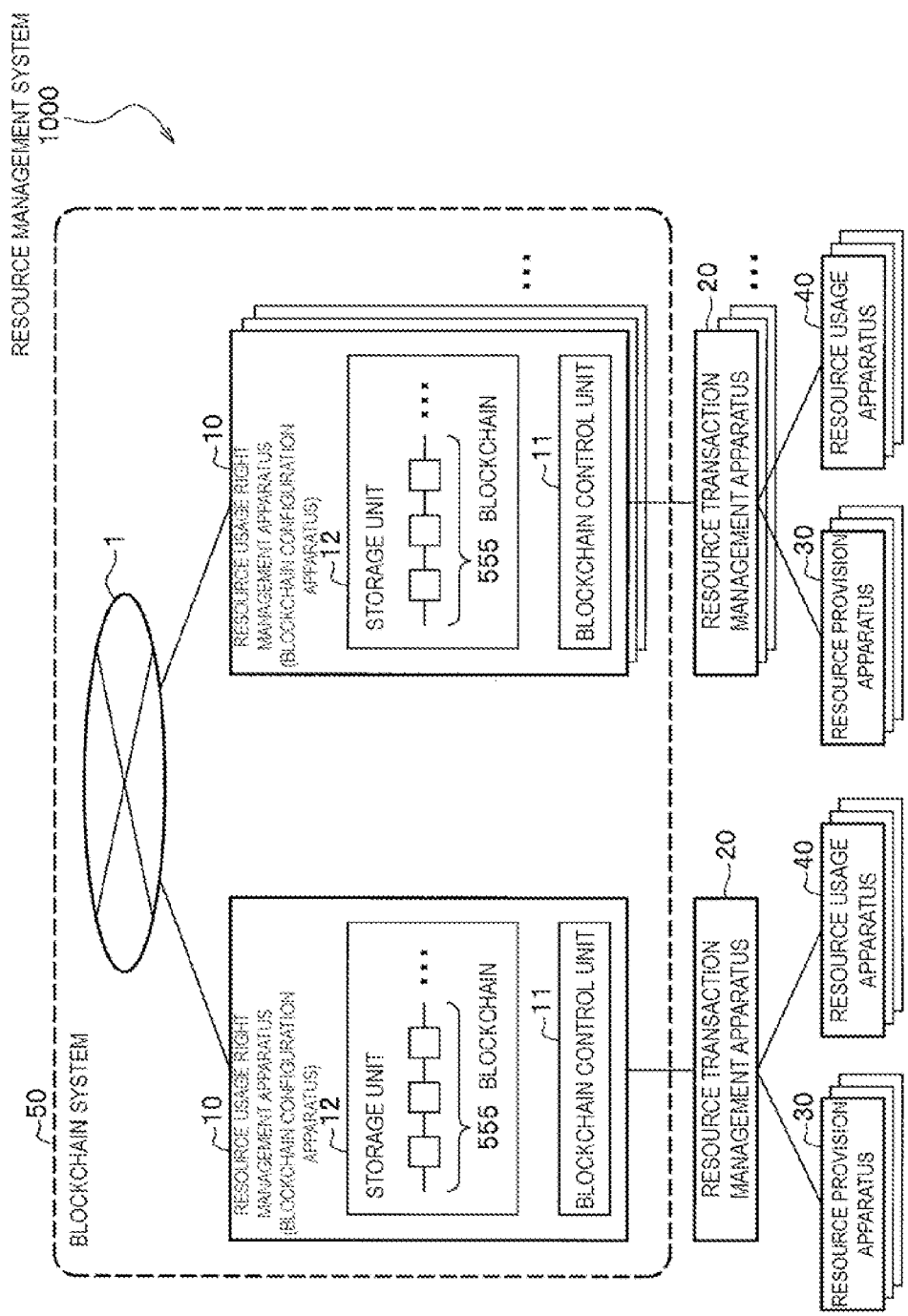
FIG. 1 is a diagram illustrating an overall configuration of a resource management system according to the present embodiment.

FIG. 1 is a diagram illustrating an overall configuration of the resource management system 1000 according to the present embodiment.

As illustrated in FIG. 1, the resource management system 1000 includes a blockchain system 50 configured with a plurality of the resource usage right management apparatuses 10 (blockchain configuration apparatuses) connected in a peer-to-peer (P2P) manner via a network 1, each resource transaction management apparatus 20 connected to each resource usage right management apparatus 10 of the blockchain system 50, and a plurality of resource provision apparatus 30 and a plurality of resource usage apparatus 40 that are connected to each resource transaction management apparatus 20.

In the resource management system 1000 according to the present embodiment, the resource transaction management apparatus 20 receives information related to resource provision ("resource provision information" described later) from each resource provision apparatus 30 and generates setting information of usage right for the resource provision information ("resource usage right information" described later). The resource transaction management apparatus 20 transmits the generated resource usage right information to the resource usage right management apparatus 10 configuring the blockchain, and the resource usage right management apparatus 10 registers and manages the resource usage right information as a blockchain.

Further, upon receiving information requesting the usage of the resource from the resource usage apparatus 40 ("resource request information" described later), the resource transaction management apparatus 20 acquires the resource usage right information stored as blockchain from the resource usage right management apparatus 10 and determines the resource that matches the condition indicated by the resource request information. The resource transaction management apparatus 20 generates information including usage right owner information, a usage time, or the like ("usage right management information" described later), issues the resource usage right information including the usage right management information as a transaction (see FIG. 2 described later) to be stored in the blockchain, transmits the information to the resource usage right management apparatus 10, and stores the information in the blockchain.

As described above, in the resource management system 1000, since the resource usage right is registered and managed by the blockchain system 50, it is possible to centrally manage the resource usage right and improve the reliability and tamper resistance of the information related to the resource usage right.

Hereinafter, each apparatus that constitutes the resource management system 1000 will be described in detail.

Resource Usage Right Management Apparatus

First, the resource usage right management apparatus 10 according to the present embodiment will be described.

The resource usage right management apparatus 10 is a blockchain configuration apparatus that manages the resource usage right relating to a resource provided by the resource provision apparatus 30 as blockchain.

The resource usage right management apparatus 10 is connected to other resource usage right management apparatuses 10 that participate in the blockchain and also connected to the resource transaction management apparatus 20. Since each of the plurality of resource usage right management apparatuses 10 participating in the blockchain has the same function, one resource usage right management apparatus 10 will be described.

The resource usage right management apparatus 10 includes a control unit, an input/output unit (both not illustrated), and a storage unit 12.

The input/output unit is configured with a communication interface that transmits/receives information to/from another resource usage right management apparatus 10 or the resource transaction management apparatus 20 connected to the input/output unit.

The storage unit 12 (storage section) is configured with a hard disk, a flash memory, a Random Access Memory (RAM), or the like. The storage unit 12 stores a block 5 including resource usage right information as a blockchain 555 (see FIG. 2, which will be described later) and a program for executing each function of the control unit.

The control unit is configured to include a blockchain control unit 11 as illustrated in FIG. 1. The control unit is implemented by, for example, a Central Processing Unit (CPU) (not illustrated) loading a program stored in the storage unit 12 into a RAM and executing the program.

The blockchain control unit 11 executes control as a general blockchain. Specifically, the blockchain control unit 11 aggregates a plurality of resource usage right information 500 (transactions) (see FIG. 2) received from the resource transaction management apparatus 20 and generates a block (block a+1) including a plurality of transactions (hereinafter referred to as a "transaction group"). In the block (block a+1), (1) aggregated transactions (transaction group), (2) nonce value (information for confirming the consistency of blockchain), and (3) a hash value ("hash value of the previous block") calculated using the transaction group, the nonce value, the hash value of the previous block (block a−1) of the latest block (block a) at the present time among the blocks stored as the blockchain 555 in the storage unit 12 are included.

Figure 2:
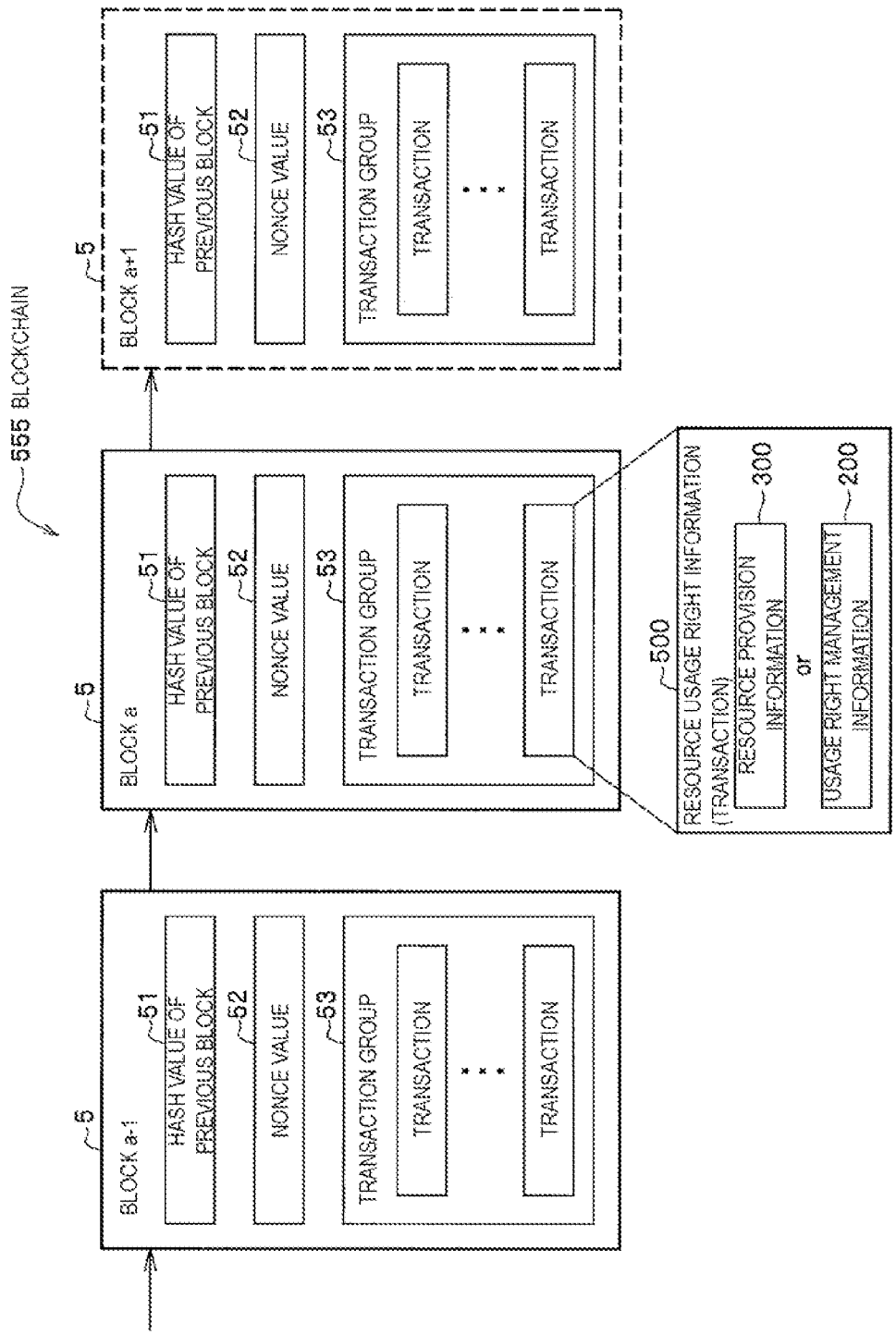
FIG. 2 is a diagram illustrating blocks stored as a blockchain in a storage unit of each resource usage right management apparatus according to the present embodiment.

FIG. 2 is a diagram illustrating the block 5 stored as the blockchain 555 in the storage unit 12 of each resource usage right management apparatus 10.

The information of a transaction group 53, a nonce value 52, and the information of a hash value 51 of the previous block are stored in each block 5.

Further, in each transaction stored as the transaction group 53, resource provision information 300 (see FIG. 4 described later) or usage right management information 200 (see FIG. 6 described later) is stored as the resource usage right information 500.

When generating a newly proposed block 5 ("block a+1" in this case), the blockchain control unit 11 performs approval processing (mining) to the other resource usage right management apparatus 10 that constitutes the blockchain, and connects the new block (block a+1) to the block a and stores the new block as the next block in the blockchain 555 when the block is approved as a normal block.

Next, the resource transaction management apparatus 20, the resource provision apparatus 30, and the resource usage apparatus 40 will be described with reference to FIG. 3.

Resource Transaction Management Apparatus

The resource transaction management apparatus 20 receives the information related to resource provision (resource provision information 300 (FIG. 4)) from the resource provision apparatus 30, issues the resource usage right information 500 (FIG. 2) including the resource provision information 300 as a transaction to be stored in the blockchain 555, and transmits the information to the resource usage right management apparatus 10. Further, upon receiving resource request information 400 (see FIG. 5 described after) from the resource usage apparatus 40, the resource transaction management apparatus 20 acquires the resource usage right information 500 stored in the blockchain 555 and determines a resource that matches a condition indicated by the resource request information 400. The resource transaction management apparatus 20 generates information (usage right management information 200 (FIG. 6)) including usage right owner information, a usage time, or the like, issues the resource usage right information 500 including the usage right management information 200 as a transaction to be stored in the blockchain 555, transmits the information to the resource usage right management apparatus 10, and stores the information in the blockchain 555.

The resource transaction management apparatus 20 is connected to the resource usage right management apparatus 10 that constitutes the blockchain system 50, and is also connected to the plurality of resource provision apparatus 30, the plurality of resource usage apparatus 40, or the like.

The resource transaction management apparatus 20 includes a control unit, an input/output unit, and a storage unit (all not illustrated).

The input/output unit is configured with a communication interface that transmits/receives information to/from the resource usage right management apparatus 10, each resource provision apparatus 30, and each resource usage apparatus 40.

The storage unit is configured with a hard disk, a flash memory, a RAM, or the like.

Figure 3:
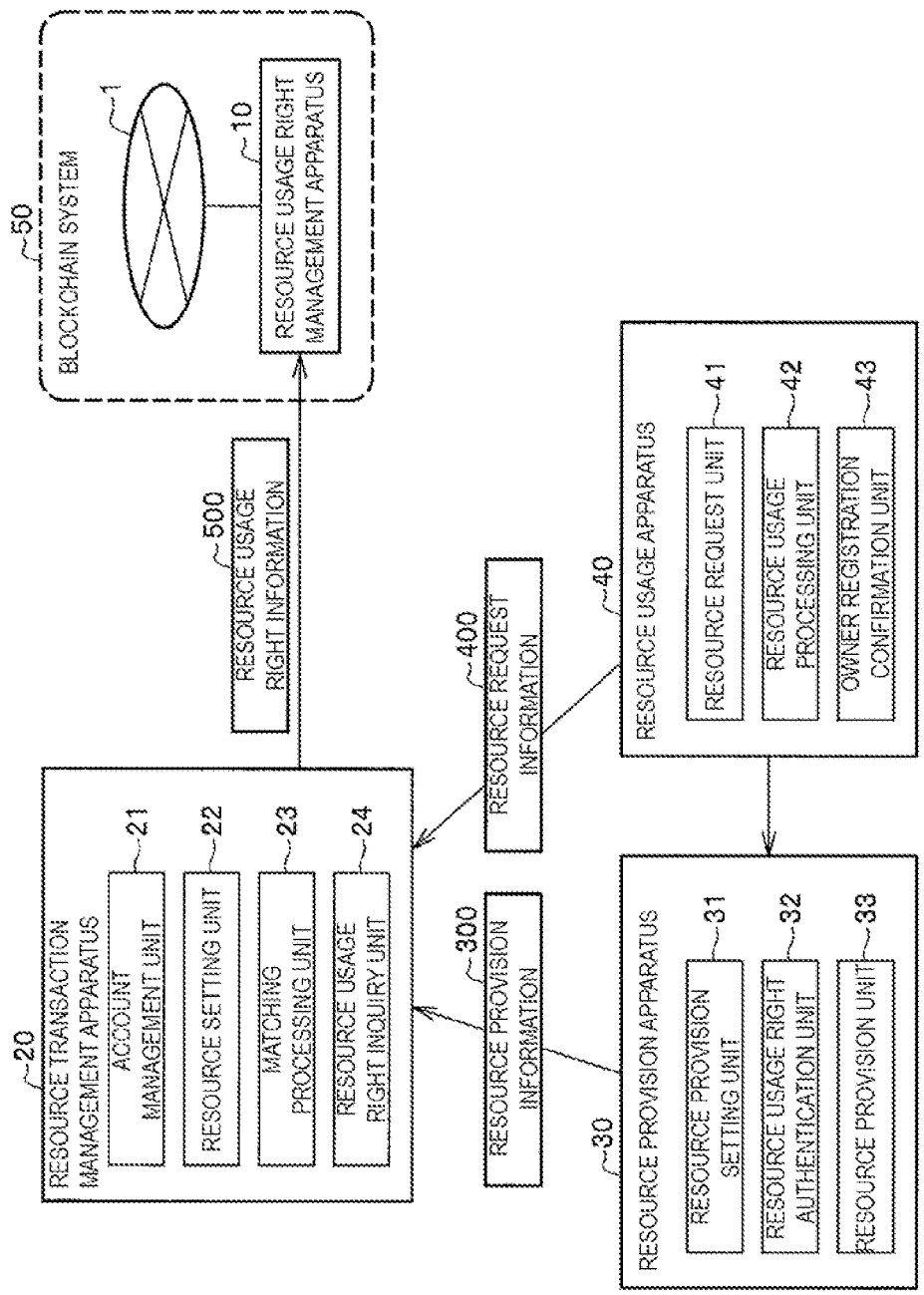
FIG. 3 is a diagram illustrating the overall configuration and the function of the resource management system according to the present embodiment.

As illustrated in FIG. 3, the control unit is configured to include an account management unit 21, a resource setting unit 22, a matching processing unit 23, and a resource usage right inquiry unit 24.

The account management unit 21 executes account management to confirm the legitimacy of users (resource provider, resource user) when received the resource provision information 300 (FIG. 4) or the like from the resource provision apparatus 30 or when received the resource request information 400 (FIG. 5) or the like from the resource usage apparatus 40. The account management unit 21 confirms the user's ID (identification information of the resource provider, identification information of the resource user, or the like) or password using, for example, Short Message Service (SMS), a one-time password, and an email. Accordingly, it is possible to prevent the illegal registration and usage of resources.

Upon receiving the resource provision information 300 (FIG. 4) transmitted by the resource provision apparatus 30, the resource setting unit 22 generates the resource usage right information 500 (FIG. 2) including the resource provision information 300 to issue the information as a transaction to be stored in the blockchain 555, and transmits the information to the resource usage right management apparatus 10.

Figure 4:
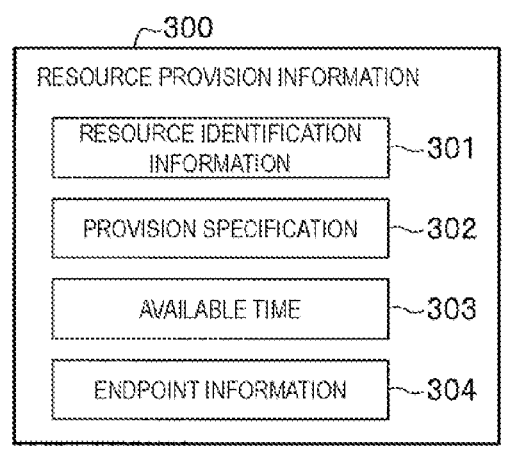
FIG. 4 is a diagram illustrating a data configuration example of resource provision information according to the present embodiment.

FIG. 4 is a diagram illustrating a data configuration example of the resource provision information 300 according to the present embodiment.

As illustrated in FIG. 4, the resource provision information 300 includes information on resource identification information 301 of a provision resource, provision specification 302, an available time 303, and endpoint information 304.

The resource identification information 301 is information for uniquely identifying the resource provided by the resource provision apparatus 30. The resource identification information 301 may use, for example, a MAC address of a network interface card as globally unique information given to the resource. Further, the resource transaction management apparatus 20 or the like may give identification information to each resource based on a logic defined in advance in the resource management system 1000.

In the provision specification 302, for example, the core number, "4 cores", the rated clock "3.00 GHz", the memory "8 GB" are stored as the specifications of the resources that the resource provision apparatus 30 can provide.

In the available time 303, for example, "2018/7/01/0:00 to 2018/7/03/23:59" is stored as a time (date and time) at which the resource of the resource provision apparatus 30 can be provided.

The endpoint information 304 stores information (for example, an URL or an IP address) that is a connection destination for using the resource of the resource provision apparatus 30.

Further, when receiving a change request for the resource provision information 300 (FIG. 4) from the resource provision apparatus 30, the resource setting unit 22 acquires the resource usage right information 500 (FIG. 2) related to the resource from the resource usage right management apparatus 10 and changes the resource provision information 300 included in the resource usage right information 500. The resource setting unit 22 stores the resource usage right information 500 (transaction) including the changed resource provision information 300 in the blockchain 555 by transmitting the information to the resource usage right management apparatus 10.

Further, when receiving a deletion request for the resource provision information 300 from the resource provision apparatus 30, the resource setting unit 22 acquires the resource usage right information 500 related to the resource from the resource usage right management apparatus 10 and deletes the information from the blockchain by transmitting the deletion request relating to the resource to the resource usage right management apparatus 10.

Upon receiving the resource request information 400 (FIG. 5) from the resource usage apparatus 40, the matching processing unit 23 acquires each of the latest resource usage right information 500 (FIG. 2) (all transactions) from the resource usage right management apparatus 10 and executes matching processing that determines the provision resource satisfying the request condition indicated by the resource request information 400.

Figure 5:
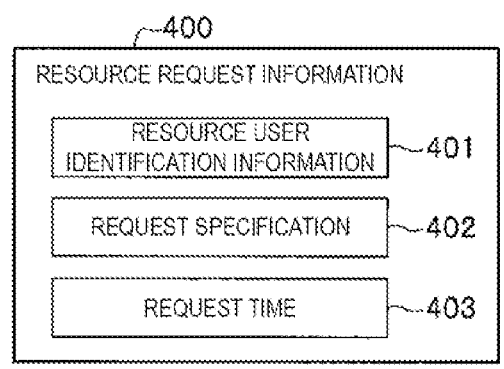
FIG. 5 is a diagram illustrating a data configuration example of resource request information according to the present embodiment.

FIG. 5 is a diagram illustrating a data configuration example of the resource request information 400 according to the present embodiment.

As illustrated in FIG. 5, the resource request information 400 includes information on resource user identification information 401, a request specification 402, and a request time 403.

The resource user identification information 401 is information for uniquely identifying the resource user or the resource usage apparatus 40.

In the request specification 402, for example, the core number "2 cores", the rated clock "3.00 GHz", the memory "4 GB" are stored as the specifications of the resources requested by the resource usage apparatus 40 (resource user).

The request time 403 stores, for example, "2018/7/02/10:00 to 2018/7/02/17:55" as the time (date and time) for requesting the resource provision.

When receiving the resource request information 400 (FIG. 5) from the resource usage apparatus 40, the matching processing unit 23 first acquires each of the latest resource usage right information 500 from the resource usage right management apparatus 10. The matching processing unit 23 determines a resource that satisfies the condition (request condition) of the request specification 402 and the request time 403 included in the resource request information 400 based on a predetermined matching logic.

This predetermined matching logic, for example, refers to the resource provision information 300 stored in the resource usage right information 500 for the information on the request specification 402 and the request time 403 included in the resource request information 400, and extracts all resources satisfying the condition by comparing the information with the provision specification 302 and the available time 303. Among the extracted resources, the difference between the request specification 402 and the provision specification 302 is made into a point or the difference between the request time 403 and the available time 303 is made into a point, and the resource with the smallest difference is determined as the resource to be provided.

When determining the resource to be provided, the matching processing unit 23 generates the usage right management information 200 (FIG. 6) including usage right owner information, a usage time, or the like. The matching processing unit 23 issues the resource usage right information 500 including the generated usage right management information 200 as a transaction to be stored in the blockchain 555, transmits the information to the resource usage right management apparatus 10, and stores the information in the blockchain 555.

Figure 6:
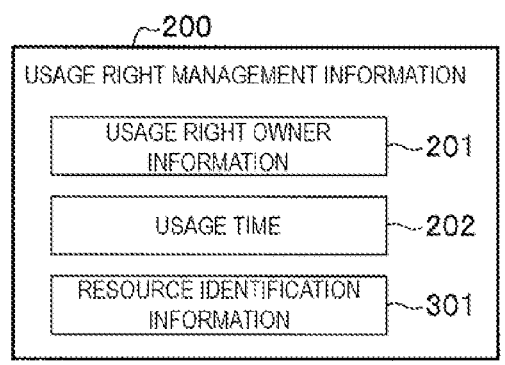
FIG. 6 is information illustrating a data configuration example of usage right management information according to the present embodiment.

FIG. 6 is information illustrating a data configuration example of the usage right management information 200 according to the present embodiment.

As illustrated in FIG. 6, the usage right management information 200 includes usage right owner information 201, a usage time 202, and the resource identification information 301 of a provision resource.

In the usage right owner information 201, the identification information (resource user identification information 401) of the user who has registered the usage of the resource included in the resource request information 400 (FIG. 5) is stored.

In the usage time 202, the information of the request time 403 included in the resource request information 400 (for example, "2018/7/02/10:00 to 2018/7/02/17:55") is stored.

In the resource identification information 301, the identification information of the provision resource determined by the matching processing unit 23 is stored with reference to the resource provision information 300 (FIG. 4).

Further, when the storage of the resource usage right information 500 including the usage right management information 200 in the blockchain is completed, the matching processing unit 23 generates response information for the resource request information 400 including the provision specification 302 of the determined resource and the endpoint information 304 and transmits the information to the resource usage apparatus 40. The response information may include information indicating that the resource request has succeeded and the provision resource has been secured, and at least the endpoint information 304.

Upon receiving a resource usage right authentication request from the resource provision apparatus 30 to confirm the usage right owner and the usage time of the resource, the resource usage right inquiry unit 24 acquires the resource usage right information 500 (FIG. 2) by inquiring of the resource usage right management apparatus 10 regarding the resource which is provided by the resource provision apparatus 30 based on the resource provision information 300 (FIG. 4). The resource usage right inquiry unit 24 extracts information of the usage right owner information 201 and the usage time 202 registered in the usage right management information 200 (FIG. 6) included in the resource usage right information 500 and transmits the information to the resource provision apparatus 30 as the response information of the resource usage right authentication request.

Further, upon receiving an owner registration confirmation request from the resource usage apparatus 40 for confirming whether oneself is registered in the usage right owner information 201, the resource usage right inquiry unit 24 acquires the resource usage right information 500 (FIG. 2) by inquiring of the resource usage right management apparatus 10 regarding the resource that the resource usage apparatus 40 has requested and determined. The resource usage right inquiry unit 24 extracts information of the usage right owner information 201 and the usage time 202 registered in the usage right management information 200 (FIG. 6) included in the resource usage right information 500 and transmits the information to the resource usage apparatus 40 as the response information of the owner registration confirmation request.

Resource Provision Apparatus

Next, the resource provision apparatus 30 will be described. The resource provision apparatus 30 is an apparatus that provides a resource to the resource usage apparatus 40 by registering the provision resource in the blockchain 555 via the resource transaction management apparatus 20. The resource provision apparatus 30 is connected to the resource transaction management apparatus 20 and the resource usage apparatus 40.

The resource provision apparatus 30 is configured with a general computer (a server, a PC, a tablet, a smartphone, or the like) including a control unit, an input/output unit, and a storage unit (all not illustrated).

Further, as illustrated in FIG. 3, the control unit is configured to include a resource provision setting unit 31, a resource usage right authentication unit 32, and a resource provision unit 33.

The resource provision setting unit 31 generates the resource provision information 300 (see FIG. 4) by acquiring information via an input/output unit (not illustrated) or the like, or the like, and transmits the information to the resource transaction management apparatus 20.

Further, the resource provision setting unit 31 transmits a change request or a delete request of the resource provision information 300 to the resource transaction management apparatus 20 when changing the content of the transmitted resource provision information 300 or stopping the resource provision itself.

When receiving a resource usage request requesting a resource usage from the resource usage apparatus 40, the resource usage right authentication unit 32 generates a resource usage right authentication request to confirm the usage right owner or the usage time of the resource (to confirm as a legitimate owner of the resource usage right) and transmits the request to the resource transaction management apparatus 20.

When the usage right owner information 201 and the usage time 202 included in the response information of the resource usage right authentication request match the identification information or the like (for example, the information of the resource user identification information 401) and the request time (current time) of the resource usage apparatus 40 that has transmitted the resource usage request, the resource usage right authentication unit 32 judges as the legitimate owner of the resource usage right. The resource usage right authentication unit 32 outputs the information indicating that it is judged as the legitimate owner of the resource usage right, to the resource provision unit 33.

When acquiring the information indicating that it is judged as the legitimate owner of the resource usage right from the resource usage right authentication unit 32, the resource provision unit 33 executes processing for providing a resource to the resource usage apparatus 40 that has transmitted the resource usage request.

Resource Usage Apparatus

Next, the resource usage apparatus 40 will be described. The resource usage apparatus 40 is an apparatus that receives the resource provision from the resource provision apparatus 30 determined as a result of the matching processing by requesting the resource transaction management apparatus 20 to use the resource. The resource usage apparatus 40 is connected to the resource transaction management apparatus 20 and the resource provision apparatus 30. The resource usage apparatus 40 is configured with a general computer (a server, a PC, a tablet, a smartphone, or the like) including a control unit, an input/output unit, and a storage unit (all not illustrated).

Further, as illustrated in FIG. 3, the control unit is configured to include a resource request unit 41, a resource usage processing unit 42, and an owner registration confirmation unit 43.

The resource request unit 41 generates the resource request information 400 (see FIG. 5) by acquiring information via an input/output unit (not illustrated) or the like, or the like, and transmits the information to the resource transaction management apparatus 20. The resource request unit 41 acquires the provision specification 302 and the endpoint information 304 of the determined resource from the resource transaction management apparatus 20 as the response information of the resource request information 400.

When reaching a start time of the request time 403 indicated by the resource request information 400, the resource usage processing unit 42 transmits a resource usage request to the resource provision apparatus 30 indicated by the acquired endpoint information 304 and executes usage processing of the resource.

The owner registration confirmation unit 43 transmits an owner registration confirmation request to the resource transaction management apparatus 20 to confirm whether oneself is correctly registered as the owner of the usage right regarding the resource for which the resource request unit 41 has received the response information. The owner registration confirmation unit 43 receives the response information with to the owner registration confirmation request from the resource transaction management apparatus 20, and confirms that own usage right is correctly registered by matching the information of the registered usage right owner information 201 and the usage time 202 included in the response information with the identification information (resource user identification information 401) and the request time 403 which have been transmitted by oneself as the resource request information 400.

Processing of Resource Management System

Next, as processing executed by the resource management system 1000 according to the present embodiment, (1) resource provision registration processing in which the resource provision apparatus 30 registers the provision resource in the blockchain 555, (2) resource request processing for matching the provision resource against the resource request information of the resource usage apparatus 40, and (3) resource usage processing when the resource usage apparatus 40 uses the registered provision resource, will be described.

Resource Provision Registration Processing

Figure 7:
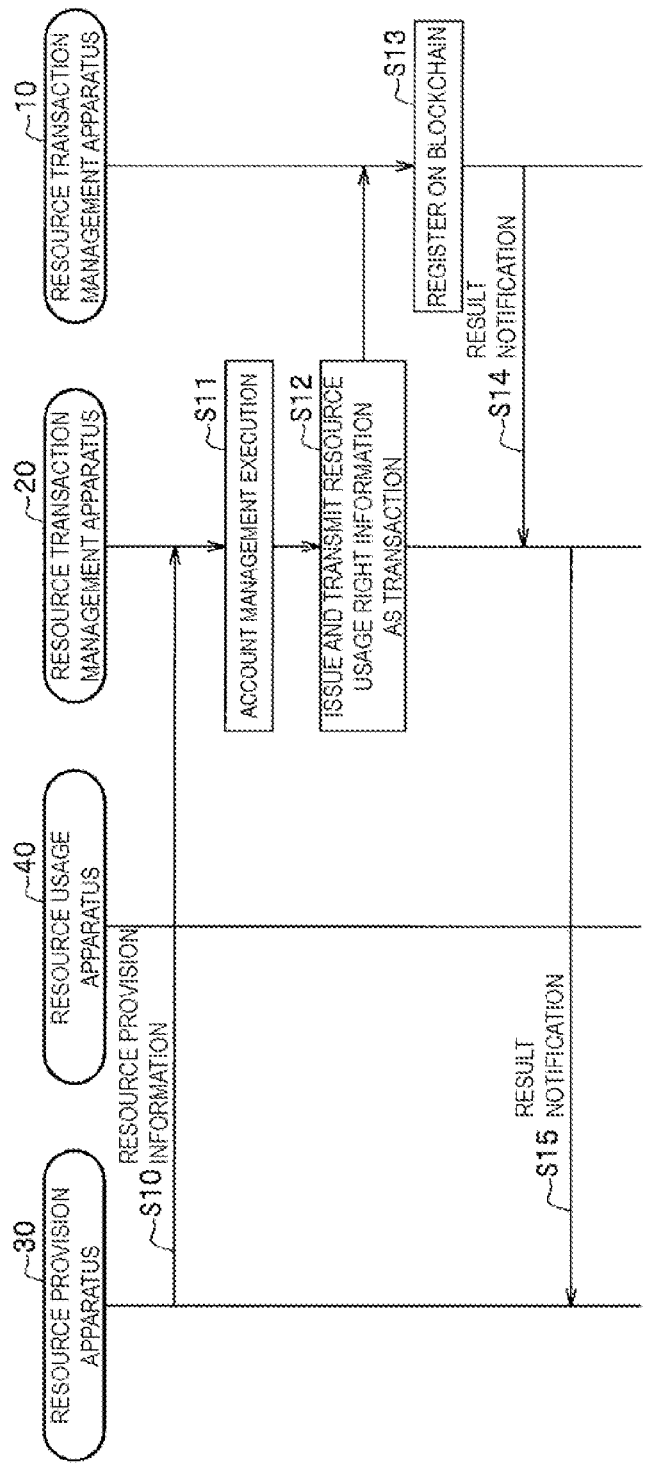
FIG. 7 is a sequence diagram illustrating a flow of resource provision registration processing of the resource management system according to the present embodiment.

FIG. 7 is a sequence diagram illustrating a flow of the resource provision registration processing of the resource management system 1000 according to the present embodiment.

First, the resource transaction management apparatus 20 receives the resource provision information 300 (FIG. 4) from the resource provision apparatus 30 (step S10). The account management unit 21 of the resource transaction management apparatus 20 executes processing of confirming the legitimacy as a resource provider (step S11: account management execution). Here, it is assumed that the account management unit 21 confirms the legitimacy of the resource provision apparatus 30 that has transmitted the resource provision information 300.

Subsequently, the resource setting unit 22 of the resource transaction management apparatus 20 generates the resource usage right information 500 (FIG. 2) including the received resource provision information 300 to issue the information as a transaction to be stored in the blockchain 555, and transmits the information to the resource usage right management apparatus 10 (step S12).

Upon receiving the resource usage right information 500, the blockchain control unit 11 of the resource usage right management apparatus 10 generates the block 5 including the resource usage right information 500, performs approval processing (mining) to the other resource usage right management apparatus 10 that constitutes the blockchain, and stores the generated block 5 as the next block 5 in the blockchain 555 by being approved as a normal block. Accordingly, the blockchain control unit 11 registers the received resource usage right information 500 in the blockchain 555 (step S13).

The blockchain control unit 11 transmits a result notification indicating that the received resource usage right information 500 is registered in the blockchain 555 to the resource transaction management apparatus 20 (step S14).

Subsequently, the resource setting unit 22 of the resource transaction management apparatus 20 transmits the received result notification to the resource provision apparatus 30 that has transmitted the resource provision information 300 (step S15).

As described above, the resource information (resource provision information 300) provided by the resource provision apparatus 30 can be registered in the blockchain 555.

Resource Request Processing

Figure 8:
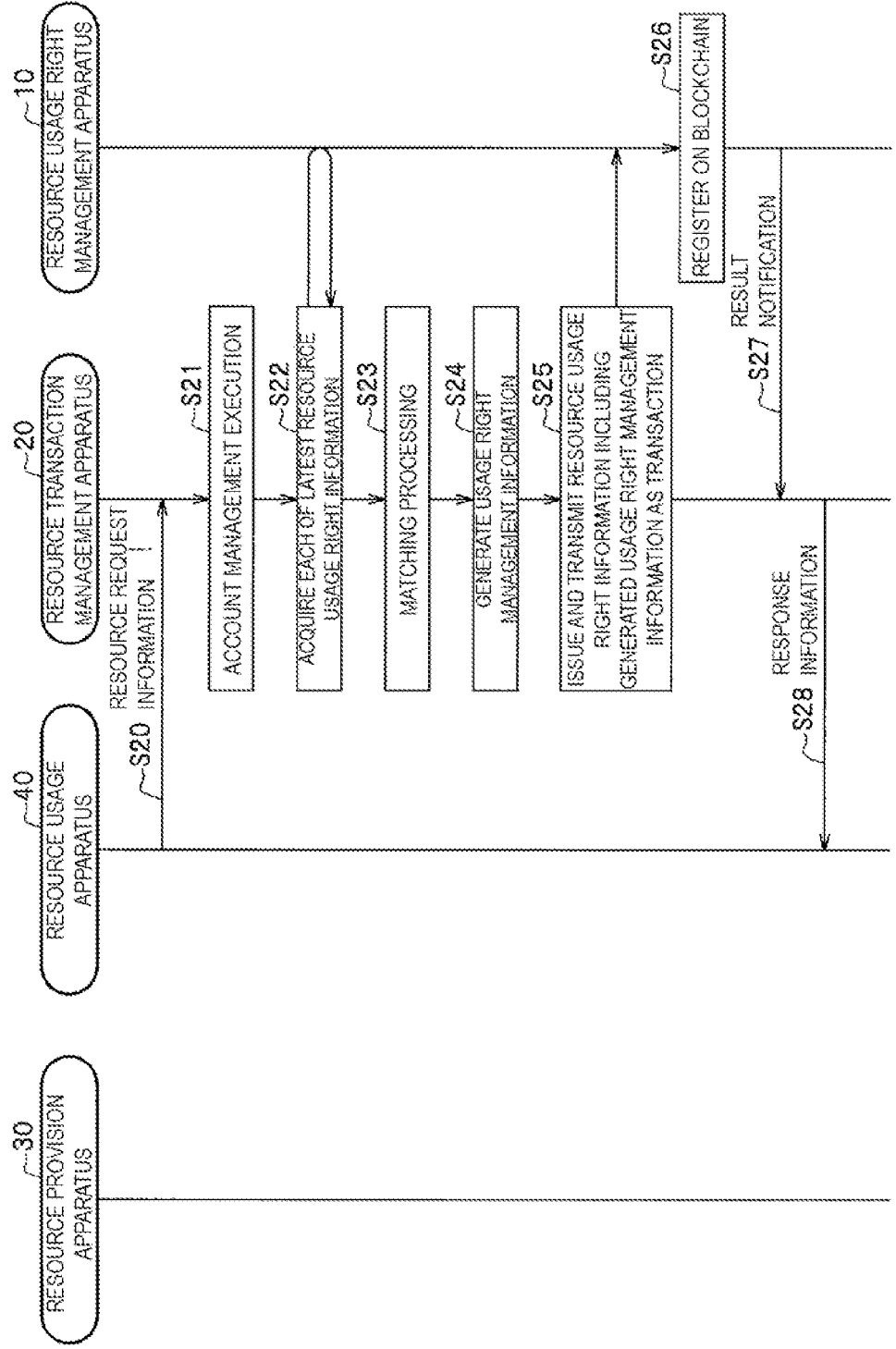
FIG. 8 is a sequence diagram illustrating a flow of resource request processing of the resource management system according to the present embodiment.

FIG. 8 is a sequence diagram illustrating a flow of the resource request processing of the resource management system 1000 according to the present embodiment.

First, the resource transaction management apparatus 20 receives the resource request information 400 (FIG. 5) from the resource usage apparatus 40 (step S20). The account management unit 21 of the resource transaction management apparatus 20 executes processing of confirming the legitimacy as a resource user (step S21: account management execution). Here, it is assumed that the account management unit 21 confirms the legitimacy of the resource usage apparatus 40 that has transmitted the resource request information 400.

Subsequently, the matching processing unit 23 of the resource transaction management apparatus 20 acquires each of the latest resource usage right information 500 (all transactions) from the resource usage right management apparatus 10 (step S22). The matching processing unit 23 executes the matching processing that determines the provision resource that satisfies the request condition indicated by the resource request information 400 (step S23).

When determining the provision resource, the matching processing unit 23 uses the information (the resource user identification information 401 and the request time 403) in the resource request information 400 (FIG. 5) to generate the usage right management information 200 (FIG. 6) including the usage right owner information 201 or the usage time 202, or the like (step S24).

The matching processing unit 23 generates the resource usage right information 500 (new resource usage right information) including the usage right management information 200 to issue the information as a transaction stored in the blockchain 555, and transmits the information to the resource usage right management apparatus 10 (step S25).

Upon receiving the resource usage right information 500 (new resource usage right information), the blockchain control unit 11 of the resource usage right management apparatus 10 generates the block 5 including the resource usage right information 500, performs approval processing (mining) to the other resource usage right management apparatus 10 that constitutes the blockchain system 50, and stores the generated block 5 as the next block 5 in the blockchain 555 by being approved as a normal block. Accordingly, the blockchain control unit 11 registers the received resource usage right information 500 (new resource usage right information) in the blockchain 555 (step S26).

The blockchain control unit 11 transmits a result notification indicating that the received resource usage right information 500 is registered in the blockchain 555 to the resource transaction management apparatus 20 (step S27).

Subsequently, the matching processing unit 23 of the resource transaction management apparatus 20 attaches the provision specification 302 and the endpoint information 304 of the determined provision resource to the received result notification to generate the response information, and transmits the information to the resource usage apparatus 40 that has transmitted the resource request information 400 (step S28).

As described above, the provision resource that satisfies the condition indicated by the resource request information 400 from the resource usage apparatus 40 is determined among the resources registered in the blockchain 555, and the identification information or the like (resource user identification information 401) and the request time 403 of the resource usage apparatus 40 can be registered in the blockchain 555 as the usage right owner information 201 and the usage time 202 of the determined resource.

Resource Usage Processing

Figure 9:
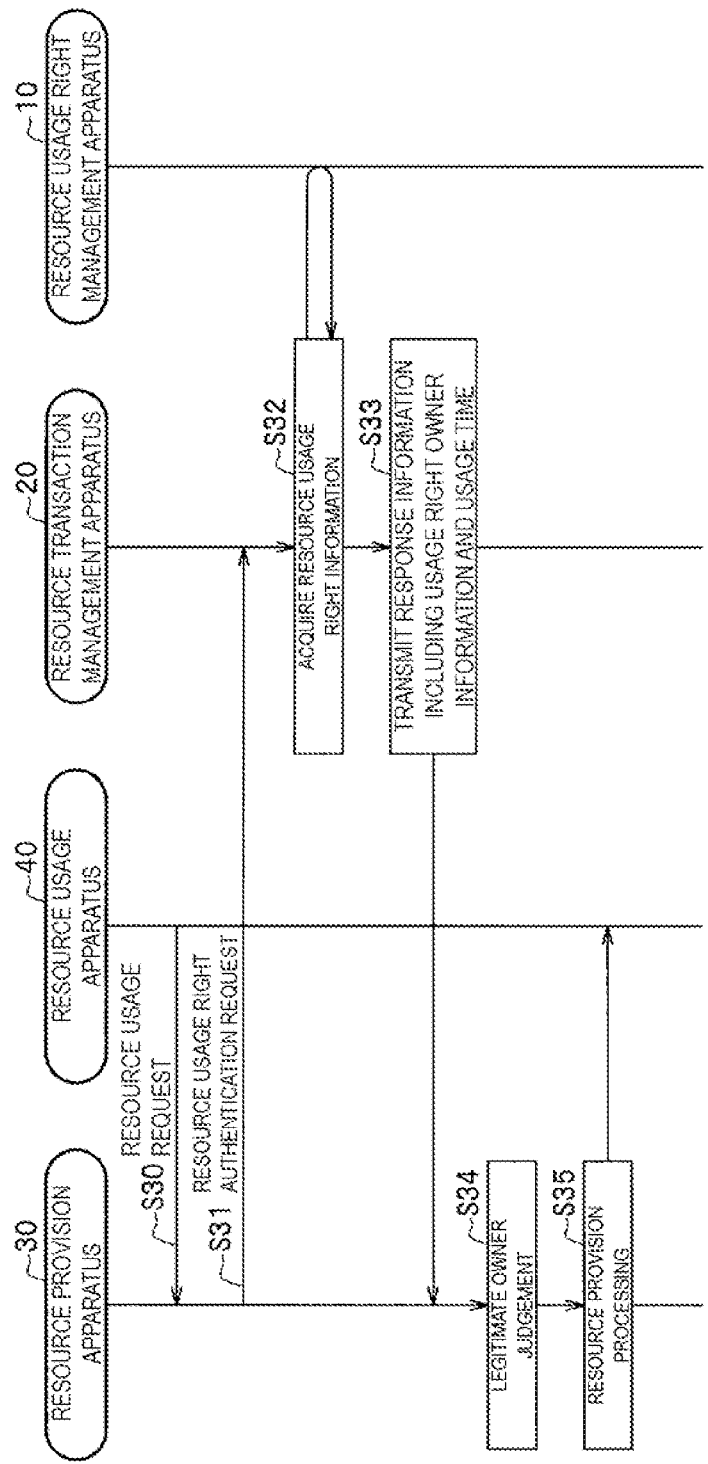
FIG. 9 is a sequence diagram illustrating a flow of resource usage processing of the resource management system according to the present embodiment.

FIG. 9 is a sequence diagram illustrating a flow of the resource usage processing of the resource management system 1000 according to the present embodiment.

When reaching the date and time (resource usage start date and time) registered in the resource request information 400, the resource usage processing unit 42 of the resource usage apparatus 40 transmits the resource usage request to the resource provision apparatus 30 indicated by the endpoint information 304 received in the step S28 of the resource request processing (FIG. 8) (step S30).

Upon receiving the resource usage request from the resource usage apparatus 40, the resource usage right authentication unit 32 of the resource provision apparatus 30 generates a resource usage right authentication request to confirm the owner of usage right and usage time of the resource, and transmits the resource usage right authentication request to the resource transaction management apparatus 20 (step S31).

When receiving the resource usage right authentication request, the resource usage right inquiry unit 24 of the resource transaction management apparatus 20 acquires the resource usage right information 500 (FIG. 2) by inquiring of the resource usage right management apparatus 10 about the resource provided by the resource provision apparatus 30 based on the resource provision information 300 (FIG. 4) (step S32). The resource usage right inquiry unit 24 extracts information of the usage right owner information 201 and the usage time 202 registered in the usage right management information 200 (FIG. 6) included in the resource usage right information 500 and transmits the information to the resource provision apparatus 30 as the response information of the resource usage right authentication request (step S33).

When the usage right owner information 201 and the usage time 202 included in the response information of the resource usage right authentication request match the identification information or the like (for example, the information of the resource user identification information 401) and the request time (current time) of the resource usage apparatus 40 that has transmitted the resource usage request, the resource usage right authentication unit 32 of the resource provision apparatus 30 judges as the legitimate owner of the resource usage right (step S34: legitimate owner judgement). The resource usage right authentication unit 32 outputs the information indicating that it is judged as the legitimate owner of the resource usage right, to the resource provision unit 33. The resource provision unit 33 executes processing of the provision resource to the resource usage apparatus 40 that has transmitted the resource usage request (step S35).

As described above, the resource provision apparatus 30 can provide the resource after authenticating whether the resource usage apparatus 40, which has transmitted the resource usage request, is the owner who has the legitimate resource usage right based on the information registered in the blockchain 555.

Modification Example 1

Next, a modification example of the resource management system 1000 according to the present embodiment will be described.

In the resource management system 1000 illustrated in FIG. 1, the resource transaction management apparatus 20 connected to the resource provision apparatus 30 and the resource usage apparatus 40 is provided. The resource setting unit 22 of the resource transaction management apparatus 20 receives the resource provision information 300 (FIG. 4) from the resource provision apparatus 30, generates resource usage right information 500 (transaction) to transmits the information to the resource usage right management apparatus 10, and registers the information in the blockchain 555. Further, the matching processing unit 23 of the resource transaction management apparatus 20 receives the resource request information 400 (FIG. 5) from the resource usage apparatus 40, determines the provision resource by matching processing, and generates the usage right management information 200 (FIG. 6) including the usage right owner information or the usage time or the like. The matching processing unit 23 generates the resource usage right information 500 including the usage right management information 200, issues the information as a new transaction stored in the blockchain, and transmits the information to the resource usage right management apparatus 10. Accordingly, the usage right of the provision resource is registered in the blockchain 555.

Figure 10:
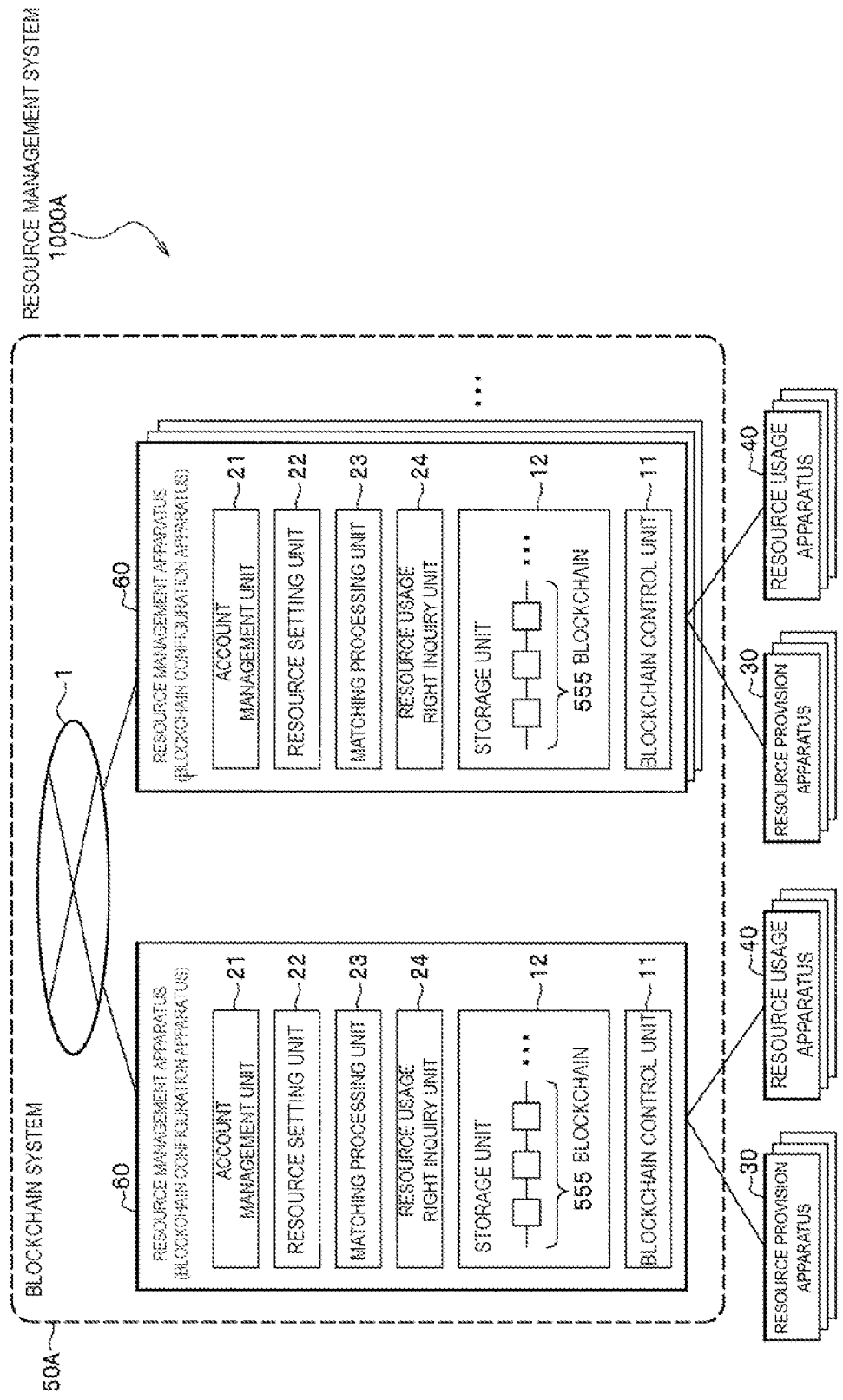
FIG. 10 is a diagram illustrating an overall configuration and a function of the resource management system according to a modification example of the present embodiment.

On the other hand, in a resource management system 1000A according to the modification example of the present embodiment, as illustrated in FIG. 10, the resource transaction management apparatus 20 of FIG. 1 is not provided outside a blockchain system 50A. Instead, a resource management apparatus 60 is provided as a blockchain configuration apparatus including both the function of the resource usage right management apparatus 10 and the function of the resource transaction management apparatus 20 of FIG. 1. In the configuration of the resource management apparatus 60 of FIG. 10, since regarding the configuration having the same function as the configuration of the resource usage right management apparatus 10 illustrated in FIG. 1 and the configuration of the resource transaction management apparatus 20 illustrated in FIG. 3, the transmission/reception between one apparatus and another apparatus is only changed to the input/output of information in the apparatus of one housing, the same name and reference numeral are given and detailed description will be omitted.

A program for executing each function is stored in the storage unit 12 of the resource management apparatus 60.

In the resource management system 1000A, the resource provision apparatus 30 transmits the resource provision information 300 (FIG. 4) to the resource management apparatus 60. Further, the resource usage apparatus 40 also transmits the resource request information 400 (FIG. 5) to the resource management apparatus 60.

As described above, similarly, the resource usage right is registered and managed in the blockchain system 50A as in the resource management system 1000 according to the present embodiment. Accordingly, according to the resource management system 1000A, it is possible to enable the centralized management of resource usage right and improve the reliability and tamper resistance of information related to the resource usage right.

REFERENCE SIGNS LIST

1 Network
5 Block
10 Resource usage right management apparatus (blockchain configuration apparatus)
11 Blockchain control unit
12 Storage unit
20 Resource transaction management apparatus
21 Account management unit
22 Resource setting unit
23 Matching processing unit 24 Resource usage right inquiry unit
30 Resource provision apparatus
31 Resource provision setting unit
32 Resource usage right authentication unit
33 Resource provision unit
40 Resource usage apparatus
41 Resource request unit
42 Resource usage processing unit
43 Owner registration confirmation unit
50, 50A Blockchain system
60 Resource management apparatus (blockchain configuration apparatus)
200 Usage right management information
300 Resource provision information
400 Resource request information
500 Resource usage right information (transaction)
555 Blockchain
1000, 1000A Resource management system

The invention claimed is:

1. A resource management system comprising:
a plurality of resource usage right management apparatuses configuring a blockchain system; and
a resource transaction management apparatus connected to the plurality of resource usage right management apparatuses, wherein the resource transaction management apparatus includes:
   a resource setting unit, including one or more processors, configured to receive resource provision information including resource identification information of an available resource, a provision specification of the resource, an available time, and connection destination information of the resource from a resource provision apparatus, and generate resource usage right information having the resource provision information that is issued as a transaction to be registered in a blockchain and that is transmitted to at least one of the plurality of resource usage right management apparatus; and
   a matching processing unit, including one or more processors, configured to:
      receive resource request information including resource user identification information, a request specification for a resource of which usage is requested, and a request time from a resource usage apparatus;
      acquire the resource usage right information registered in the blockchain from the resource usage right management apparatus;
      determine a resource that satisfies a request condition indicated by the resource request information by referring to the resource provision information included in the acquired resource usage right information; and
      generate usage right management information including usage right owner information and a usage time of the resource corresponding to the resource identification information of the determined resource based on the resource user identification information and the request time included in the resource request information, and transmit new resource usage right information having the generated usage right management information, which is issued as a transaction, to the resource usage right management apparatus, wherein:
the at least one of the plurality of resource usage right management apparatuses includes a blockchain control unit, including one or more processors, configured to acquire the resource usage right information, generate a block including the acquired resource usage right information, and register the generated block as a new block of the blockchain stored in a storage unit.

2. The resource management system according to claim 1, wherein the resource transaction management apparatus further includes an account management unit, including one or more processors, configured to execute, when receiving the resource provision information from the resource provision apparatus and when receiving the resource request information from the resource usage apparatus, account management that confirms legitimacy of a resource provider and a resource user.

3. The resource management system according to claim 1, wherein the resource transaction management apparatus further includes:
   a resource usage right inquiry unit configured to:
      acquire, upon receiving a resource usage right confirmation request to confirm legitimacy of a resource user from the resource provision apparatus, resource usage right information related to a registered resource of the resource provision apparatus from the blockchain stored in the resource usage right management apparatus; and
      confirm legitimacy of the resource usage apparatus that has requested a resource usage for the resource provision apparatus including transmitting usage right owner information and a usage time registered in the usage right management information included in the acquired resource usage right information to the resource provision apparatus that has transmitted the resource usage right confirmation request.

4. A resource management method of a resource management system including a plurality of resource usage right management apparatuses configuring a blockchain system and a resource transaction management apparatus connected to the resource usage right management apparatuses, the resource management method comprising:
   receiving, at the resource transaction management apparatus, resource provision information including resource identification information of an available resource, a provision specification of the resource, an available time, and connection destination information of the resource from a resource provision apparatus and transmitting resource usage right information having the resource provision information, which is issued as a transaction to be registered in a blockchain, to at least one of the plurality of resource usage right management apparatuses;
   acquiring, by the at least one of the plurality of resource usage right management apparatuses, the resource usage right information;
   generating, by the at least one of the plurality of resource usage right management apparatuses, a block including the acquired resource usage right information;
   registering, by the at least one of the plurality of resource usage right management apparatuses, the generated block as a new block of the blockchain stored in a storage unit;
   receiving, at the resource transaction management apparatus, resource request information including resource user identification information, a request specification for a resource of which usage is requested, and a request time from a resource usage apparatus;

acquiring, by the resource transaction management apparatus, the resource usage right information registered in the blockchain from the resource usage right management apparatus;

determining, by the resource transaction management apparatus, a resource that satisfies a request condition indicated by the resource request information including referring to the resource provision information included in the acquired resource usage right information;

generating, by the resource transaction management apparatus, usage right management information including usage right owner information and a usage time of the resource corresponding to the resource identification information of the determined resource based on the resource user identification information and the request time included in the resource request information; and transmitting, by the resource transaction management apparatus, new resource usage right information having the generated usage right management information, which is issued as a transaction, to the at least one of the resource usage right management apparatus; and acquiring resource usage right information, at the at least one of the plurality of resource usage right management apparatuses, including the new usage right management information; and generating, by the at least one of the plurality of resource usage right management apparatuses, a block including the acquired resource usage right information- and registering the generated block as a new block of the blockchain stored in a storage unit.

5. A resource transaction management apparatus of a resource management system including a plurality of resource usage right management apparatuses configuring a blockchain system and the resource transaction management apparatus connected to at least one of the plurality of resource usage right management apparatuses, the resource transaction management apparatus comprising:

a resource setting unit, including one or more processors, configured to:

receive resource provision information including resource identification information of an available resource, a provision specification of the resource, an available time, and connection destination information of the resource from a resource provision apparatus; and generate resource usage right information having the resource provision information that is issued as a transaction to be registered in a blockchain and that is transmitted to the at least one of the plurality of resource usage right management apparatuses; and a matching processing unit, including one or more processors, configured to:

receive resource request information including resource user identification information, a request specification for a resource of which usage is requested, and a request time from a resource usage apparatus, acquire the resource usage right information registered in the blockchain from the at least one of the plurality of resource usage right management apparatus;

determine a resource that satisfies a request condition indicated by the resource request information by referring to the resource provision information included in the acquired resource usage right information;

generate usage right management information including usage right owner information and a usage time of the resource corresponding to the resource identification information of the determined resource based on the resource user identification information and the request time included in the resource request information, and transmit new resource usage right information having the generated usage right management information, which is issued as a transaction, to the at least one of the plurality of resource usage right management apparatuses.

* * * * *